United States Patent
Ryne et al.

(10) Patent No.: US 6,923,473 B2
(45) Date of Patent: Aug. 2, 2005

(54) TELESCOPING COLUMN HAVING RAKE SPRING ASSIST

(75) Inventors: Patrik M. Ryne, Bay City, MI (US);
Chad E. Gerding, Chesaning, MI (US);
Bruce D. Kniebbe, Birch Run, MI (US)

(73) Assignee: Delphi Technologies, Inc., Troy, MI (US)

( * ) Notice: Subject to any disclaimer, the term of this patent is extended or adjusted under 35 U.S.C. 154(b) by 127 days.

(21) Appl. No.: 10/384,111

(22) Filed: Mar. 7, 2003

(65) Prior Publication Data

US 2003/0168843 A1 Sep. 11, 2003

Related U.S. Application Data

(60) Provisional application No. 60/363,196, filed on Mar. 11, 2002.

(51) Int. Cl.[7] .................................................. B62D 1/18
(52) U.S. Cl. ...................................................... 280/775
(58) Field of Search .............................. 280/775, 779; 74/492

(56) References Cited

U.S. PATENT DOCUMENTS 4,244,237 A * 1/1981 Sprunger .................... 74/493
4,307,626 A   12/1981 Sanada et al.
4,463,626 A    8/1984 Kazaoka et al.
5,168,768 A   12/1992 Easton
5,199,319 A *  4/1993 Fujiu ......................... 74/493
5,301,567 A    4/1994 Snell et al.
5,598,741 A *  2/1997 Mitchell et al. ............. 74/493
5,788,277 A    8/1998 Hibino et al.
5,823,062 A   10/1998 Snell et al.
6,035,739 A    3/2000 Milton

* cited by examiner

*Primary Examiner*—Faye M. Fleming
(74) *Attorney, Agent, or Firm*—Michael D. Smith

(57) ABSTRACT

A steering column assembly for a vehicle includes a steering column for operatively mounting a hand controller used for controlling the steering of the vehicle. A support member is disposed adjacent the steering column and is coupled thereto by a rake pivot connection which enables the steering column to pivot about an axis of the rake pivot connection relative to the support member along a rake adjustment path for adjusting a rake position of the steering column. A torsion spring is disposed about the axis between the steering column and the support member to provide a constant spring bias force therebetween. The torsion spring preferably provides near-equilibrium support of the column through its full rake adjust travel. The torsion spring further is readily adaptable to telescopic-type columns and does not interfere with the telescopic adjustment.

15 Claims, 5 Drawing Sheets

TELESCOPING COLUMN HAVING RAKE SPRING ASSIST

This application claims the benefit of U.S. Provisional Application No. 60/363,196, filed Mar. 11, 2002.

TECHNICAL FIELD

This invention relates generally to automotive steering columns, and more particularly to those having rake adjust.

BACKGROUND OF THE INVENTION

Steering columns for automotive vehicles are often equipped with various adjustments that enable the operator of the vehicle to position and lock the column in any of a number of positions. Some columns includes brake and telescope adjustment to enable the operator to adjust the angle of the column as well as the fore and aft telescope position of the hand wheel.

Current designs are using compression springs, torsion springs or a bending leaf spring which applies the load in the area of the rake mechanism. Due to packaging and position the springs will have to deflect a large percentage of its full capacity. Therefore, the spring force varies greatly. The driver experiences a change of rake effort when going from full down to full up.

FIG. 1 shows a prior art telescoping column assembly having an upper jacket 12 which telescopes relative to a lower jacket 14. The column 10 is mounted on a bracket 16 of a vehicle chassis by a pivot bolt 18 to enable the column assembly 10 to pivot or rake about a transverse axis 20 of the pivot bolt 18 for adjusting the up and down movement of the column assembly 10. A rake mechanism 22 is carried on a column bracket 24 that is fixed stationarily to structure the vehicle and includes a rake bolt 26 extending through the bracket 24 and through an associated sliding bracket 28 fixed to the upper column 12 and slideable therewith relative to the bracket 24 during telescopic movement of the upper column 12. The rake mechanism 22 serves to lock and release, respectively, the column assembly 10 in a selected position of pivotal adjustment about the pivot bolt 18. When the rake mechanism 22 is operated to unlock the column assembly 10, the column assembly 10 is free to pivot about the axis 20 of the pivot bolt 18. In order to counteract the weight of the column assembly 10 when the rake mechanism is unlocked, a compression spring 30 acts between the mounting bracket 24 and sliding bracket 28. The compression spring 30 applies an upward force on the sliding bracket 28 to counteract the gravitational force of the weight of the column 10 pivoting about the pivot bolt 18 when the rake mechanism 22 is released. It will be seen that the compression spring 30 is spaced from the axis 20 of the pivot bolt 18 and thus must be compressible over a considerable distance to provide spring assist during the full movement of the column assembly 10 about the pivot bolt 18. Due to the inherent spring constant characteristic of coil springs, the spring 30 offers a greater counteracting lifting force to the column assembly 10 when in a lowered position as compared to when the column assembly is pivoted upwardly to a raised position, increasing the distance between the bracket 24 and sliding bracket 28 and thus opening the gap across which the spring 30 must span. Inherently, an operator will notice a variable effort in positioning the column assembly 10 up or down about the pivot bolt 18. With the compression spring 30 situated out from the pivot bolt 18, it is likely that the column assembly 10 might be in equilibrium (i.e., requiring no lifting or lowering force by the operator) somewhere near the middle position of the up and down column travel. To lower the column 10 from such equilibrium position, an operator must overcome the counteracting lifting force of the spring 30, requiring application of considerable downward force (about 80–100 N) to rake the column 10 down from the equilibrium middle position. Similarly, if the operator wishes to move the column from the equilibrium middle position upwardly, the operator will have to apply a similar lifting load (i.e., 80–120 N) to rake the column 10 up.

Since the spring 30 acts constantly between the bracket 24 and the sliding bracket 28, it necessarily introduces a certain amount of frictional resistance to the telescoping movement of the upper column 12 and sliding bracket 28 relative to the bracket 24. This frictional dragging effect of the spring 30 against the sliding bracket 28 introduces extra effort by the operator to telescope the column assembly 10. The present invention provides a spring assist arrangement which overcomes or greatly minimizes the foregoing limitations of the prior art.

SUMMARY OF THE INVENTION

A steering column assembly constructed according to the present invention comprises a steering column for operatively mounting a hand controller used for controlling steering of the vehicles, a support member disposed adjacent the steering column, a rake pivot connection coupling the steering column to the support member enabling the steering column to pivot about an axis of the rake pivot connection along a rake adjust path for adjusting a rake position of the steering column. According to the invention, a torsion spring is disposed about the axis and acts between the steering column and the support member to provide a constant spring bias force therebetween.

The invention has the advantage of orienting the spring assist about the rake pivot axis such that the spring provides a constant or nearly constant assist force through supporting the column relative to the support member, such that the operator of the vehicle experiences very little change in the effort required to position the column in different rake angles throughout the full travel of the rake adjustment. Preferably, the torsion spring provides a near equilibrium support to the steering column throughout its full rake travel, such that a very minimal effort is required on the part of the operator to move the column between the positions and, once positioned, the torsion spring supports the column unassisted in the desired position of adjustment.

The invention has the further advantage of isolating the reaction of the torsion spring of the rake adjust from telescopically adjustable upper and lower column jackets of a column assembly. According to a preferred feature of the invention, the torsion spring is carried on the lower jacket which is stationary relative to the telescoping upper jacket. The torsion spring reacts between the lower column jacket and the support member during rake adjustment without direct engagement with the upper column jacket, and as such does not produce any drag or interference to the telescoping action of the column assembly.

Another advantage of the present invention is that the position of the torsion spring relative to the axis provides full range of support to the column during its rake adjustment with a corresponding small deflection of the torsion spring, eliminating large variations and rake effort due to large deflections of the spring. As such, the small range of movement of the torsion spring enables the designer of rake adjust columns to select a spring which provides equilibrium or near equilibrium support of the column in any one position, which changes very little over the full range of rake movement of the column compared with the comparably small deflection of the torsion spring. In this way, a near equilibrium support of the column is maintained throughout its full rake adjust travel.

THE DRAWINGS

The present invention will now be described, by way of example, with reference to the accompanying drawings, in which.

DETAILED DESCRIPTION

Figure 2:
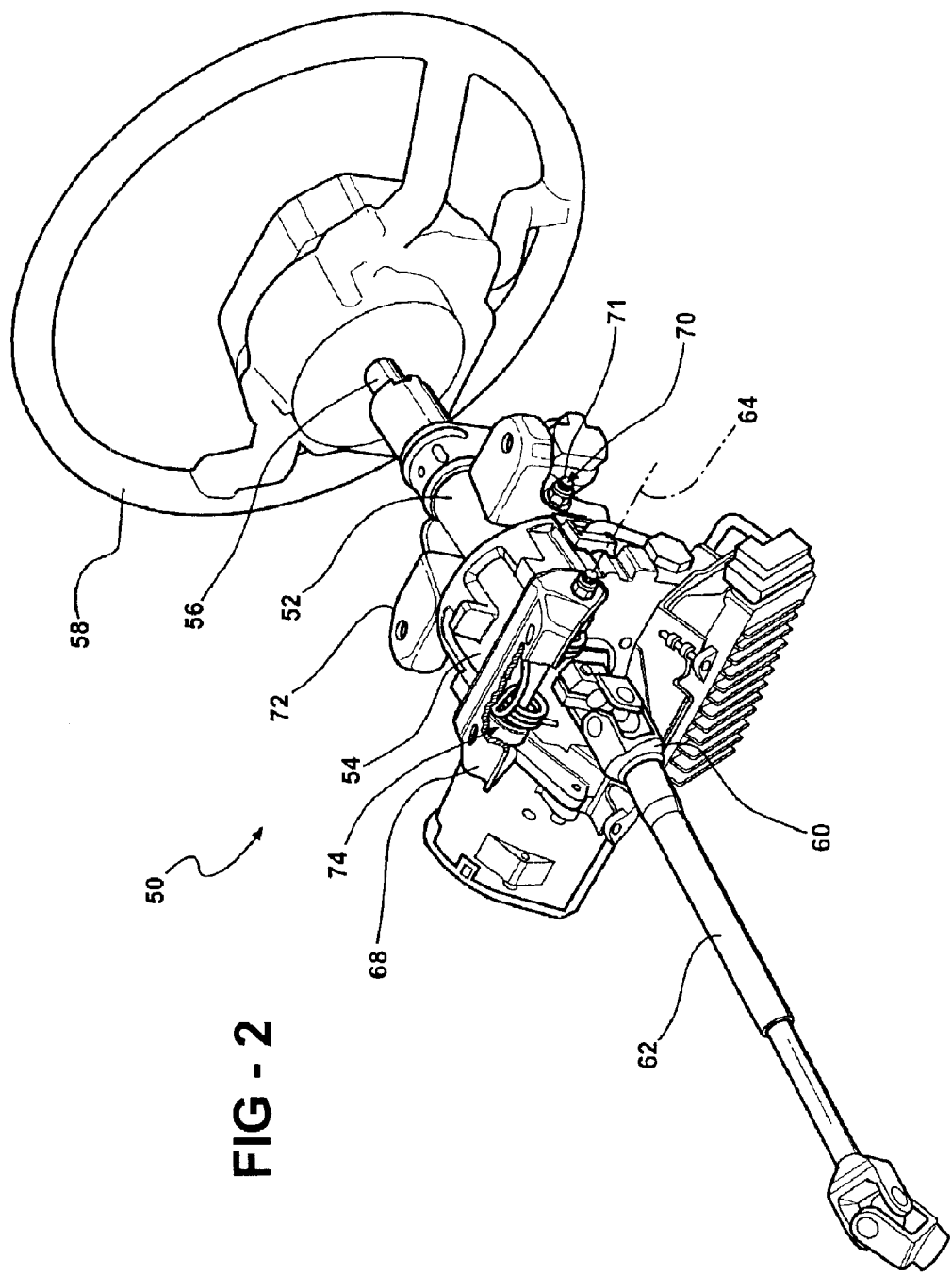
FIG. 2 is a perspective view of a column assembly constructed according to the present invention.
Figure 3:
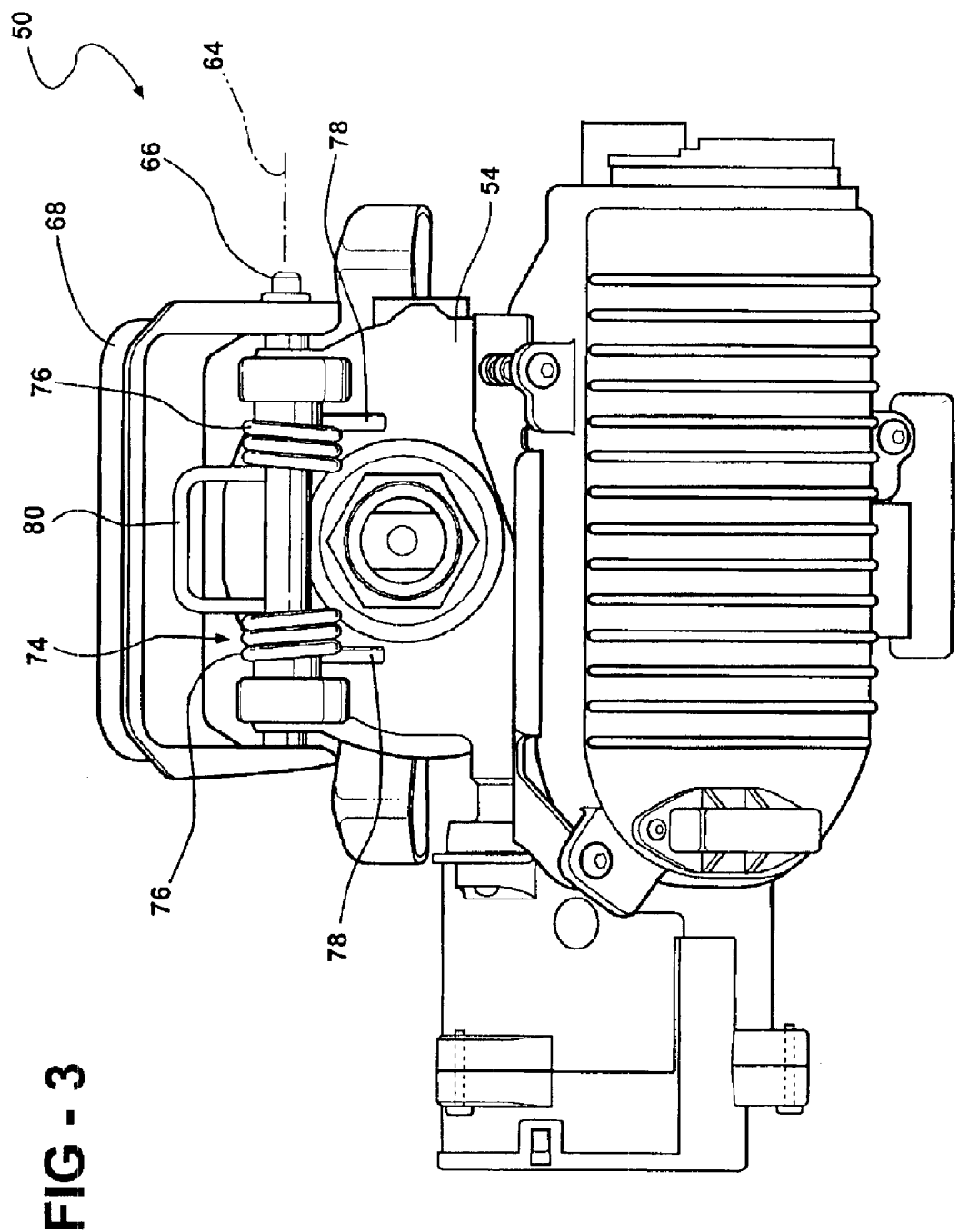
FIG. 3 is an end view of a column, with the intermediate shaft removed, showing features of the rake pivot adjust.
Figure 4:
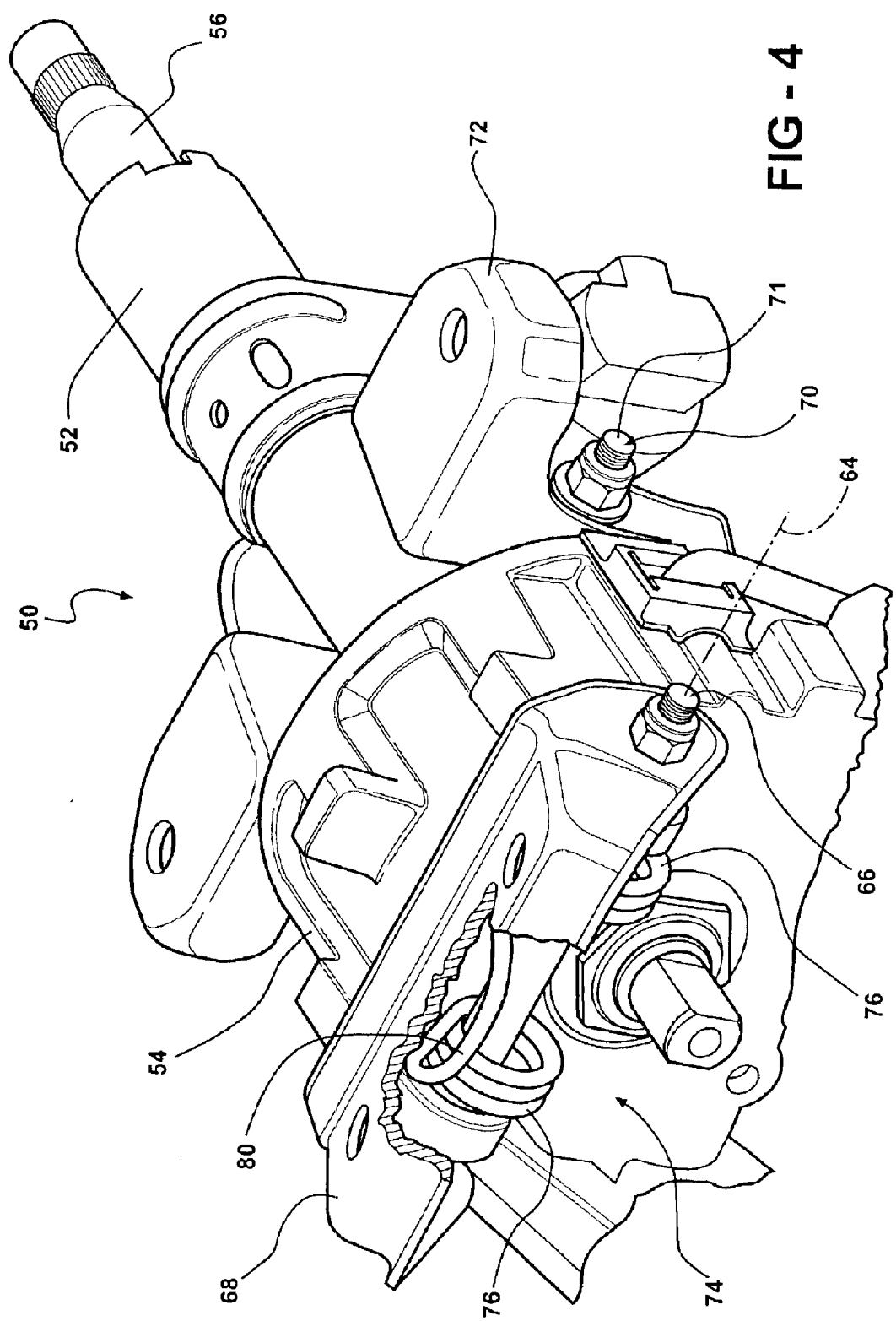
FIG. 4 is a fragmentary perspective view, shown partly broken away, of the column of FIG. 3 showing further details of the rake adjust.

Turning now to FIGS. 2–4, a column assembly 50 constructed according to a presently preferred embodiment of the invention is shown having an upper column jacket 52 which is supported for telescoping movement in the direction of its length relative to an axially stationary lower column jacket 54. An upper steering shaft 56 extends through the column jackets 52, 54 between an upper end on which a hand control 58 (e.g., a steering wheel) is mounted and a lower end coupled by a universal joint 60 to an intermediate steering shaft 62. The column jackets 52,54 and upper shaft 56 are supported for pivotal movement about an axis 64 of a pivot bolt 66 which extends transversely of the column jackets 52,54 and is supported by a stationary mounting bracket 68 fixed to stationary support structure of a vehicle. The column assembly 50 is thus able to pivot up and down about the axis 64 of the pivot bolt 66 to enable an operator to adjust the up and down tilt or rake of the column 50 to a desired position. A rake mechanism 70 is provided and is operative to lock and release, respectively, the column 50 for pivot movement about the bolt 66. The rake mechanism 70 is carried on a stationary rake bracket 72 which is secured to the support structure of the vehicle.

Figure 5:
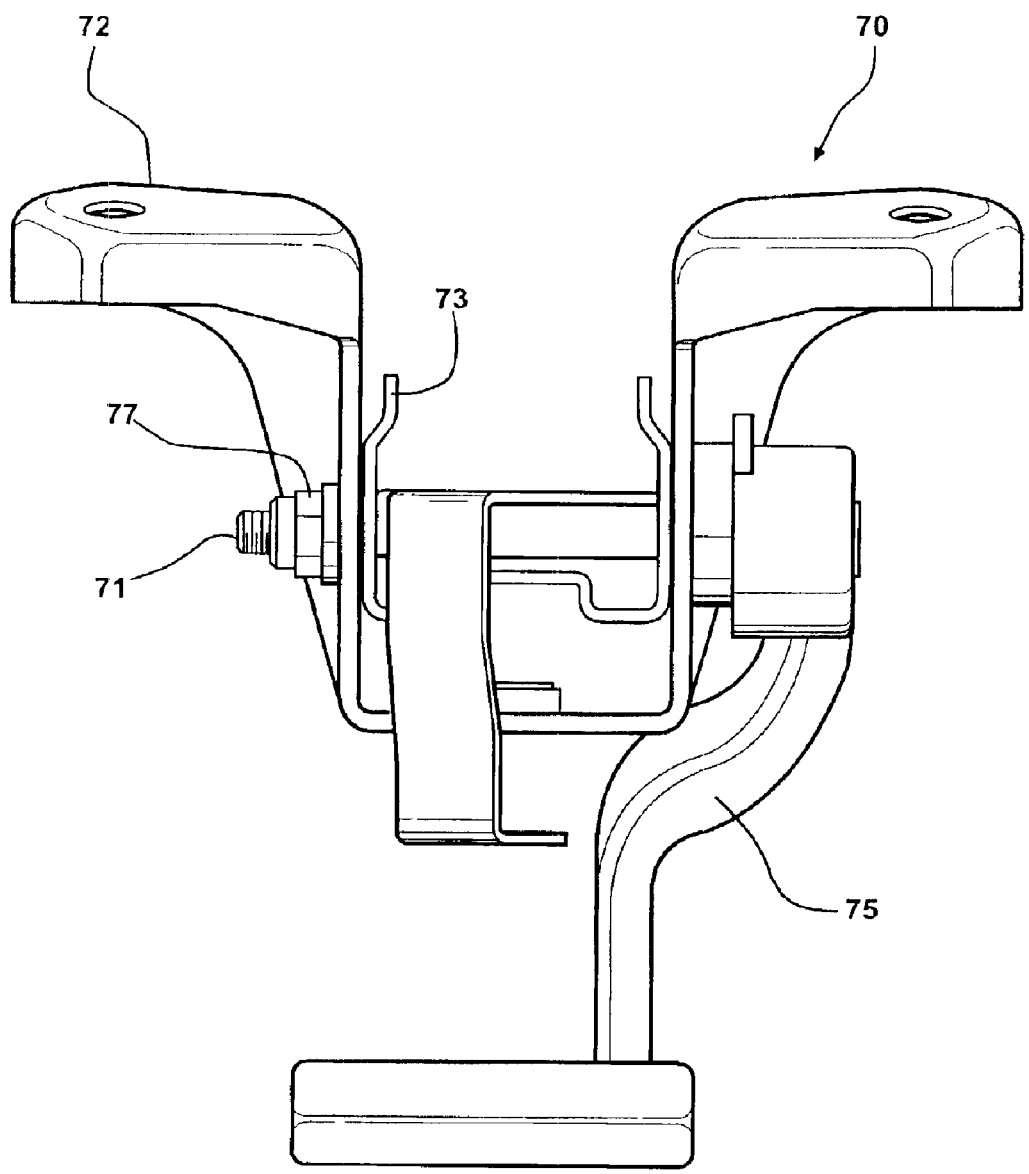
FIG. 5 is a view of the rake lock/release mechanism of the column assembly.

The rake mechanism 70 is best shown in FIG. 5 and may be of the compression-type mechanism which selectively locks or releases the column 50 for pivotal rake movement about the axis 64 (FIGS. 2–4). The rake release/lock mechanism 70 includes a rake bolt 71 extending through the stationary rake bracket 72 and through an associated sliding bracket 73 which is fixed to the upper column 52 and slideable therewith relative to the bracket 72 during telescoping movement of the upper column. The rake bolt 71 carries a control handle 75 at one end for selectively rotating the rake bolt 71 relative to a compression nut 77 carried on the opposite side of the fixed bracket 72. Turning the handle 75 in one direction loosens the rake bolt 71 and enables both telescopic and rake adjustment of the column relative to the stationary bracket 22, and rotating the handle 75 in the opposite direction tightens and compresses the sides of the fixed bracket 24 against the sliding bracket 73 to lock the column in a selection position of rake and/or telescopic adjustment.

Figure 1:
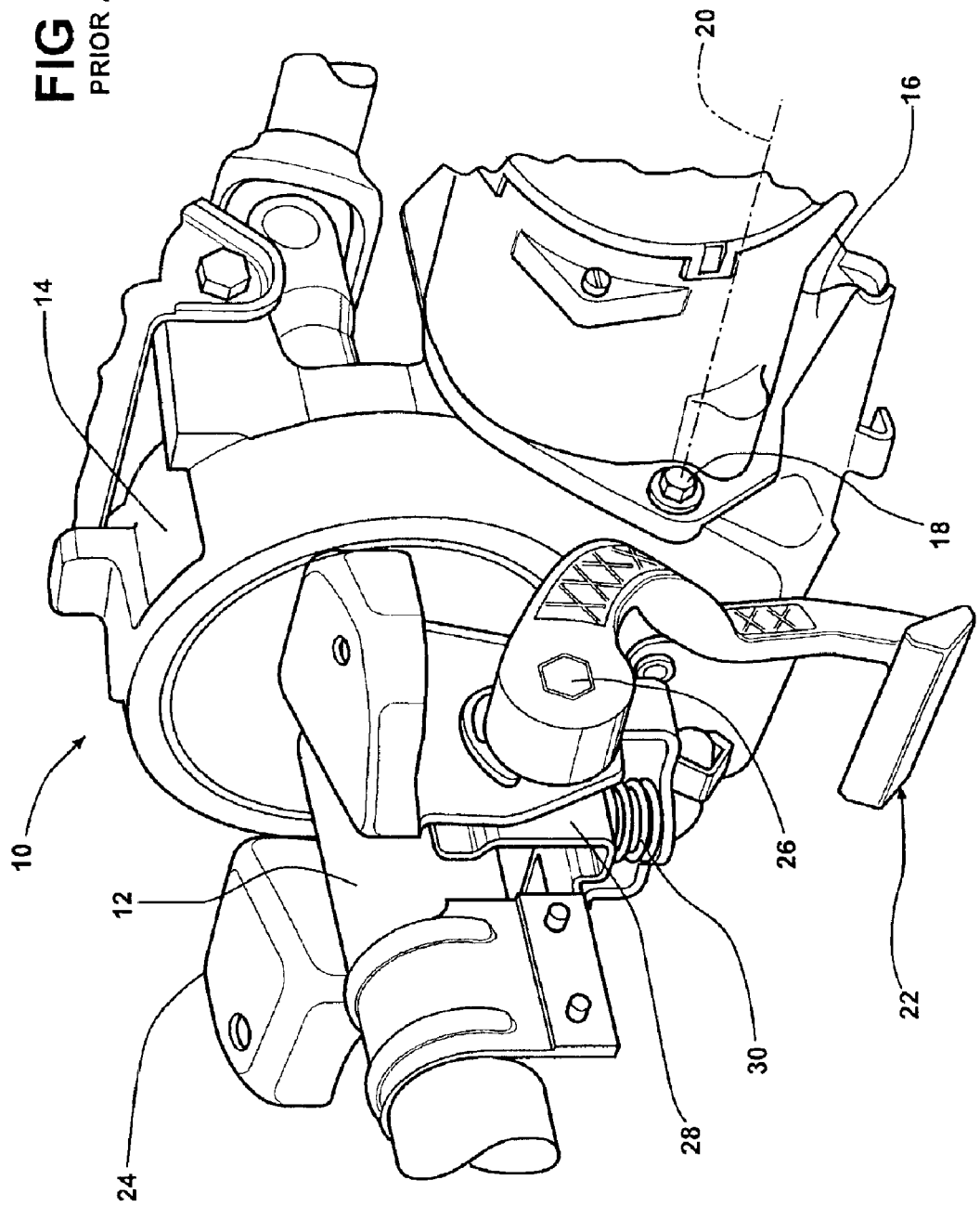
FIG. 1 is a prior art column rake adjust mechanism employing a coil spring which interferes with the telescopic movement of the column and provides variable spring assist to rake adjust.

According to the invention, a torsion spring 74 is disposed about the pivot bolt 66 and acts between the stationary bracket 68 and the lower column 54, so as to apply a constant lifting force to the column 50 about the axis 64 at the pivot of the column assembly 50, rather than at a location spaced from the pivot axis 64 as in the prior art compression spring 30 of FIG. 1. Turning more particularly to FIGS. 3 and 4, the torsion spring 74 has a pair of coiled body sections 76 encircling the pivot bolt 66 that terminate at their ends in end leg portions 78 which confront and bear against the lower column 54. An intermediate leg portion 80 extends between and joins the coiled portions 76 and is angularly offset form the end leg portions 78. The intermediate leg confronts and bears against the bracket 68 in such manner that the coiled portions 76 are placed under a state of constant compression due to the counter-reactions between the legs 78 and leg 80 against the respective structures. Such introduces a constant recoil force to the coiled body 76, urging the legs 78 and arm 80 outwardly against their respective structures, imparting a lifting force to the column assembly 50. By locating the torsion spring 74 at the pivot axis 64, very little change in the recoil movement of the spring is necessary to bring about a relatively large change in the rake position of the column assembly 50. Consequently, the torsion spring 74 delivers a generally uniform counterforce to the downward gravitational force of the column assembly 50, and can be engineered to provide an equilibrium or near equilibrium condition of the column assembly to the full range of rake movement about the pivot bolt 66, unlike the prior coil spring 30 of FIG. 1. Consequently, very little effort (e.g., 1–5 N) is needed by the operator to adjust the rake of the column. Once adjusted, the column remains in position without being urged under significant spring return force back toward a pre-set equilibrium position, as with the prior art devices of FIG. 1.

The torsion spring 74 is spaced from the upper telescoping column 52 and in no way impairs the telescoping effort required to move the upper column 52 relative to the lower column 54.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A steering column assembly for a vehicle, comprising:
   a steering column for operatively mounting a hand controller used for controlling steering of the vehicle, said steering column being adjustable telescopically and including an upper column jacket and a lower column jacket, said upper column jacket being selectively slidable telescopically relative to said lower column jacket;
   a support member disposed adjacent said steering column;
   a rake pivot connection coupling said steering column to said support member enabling said steering column to pivot about an axis of said rake pivot connection along a rake adjust path for adjusting a rake position of said steering column; and
   a torsion spring disposed about said axis acting between said steering column and said support member to provide a constant spring bias force therebetween.

2. The assembly of claim 1, wherein said torsion spring is wound about said axis.

3. The assembly of claim 2, wherein said support member comprises a pivot bolt.

4. The assembly of claim 3 wherein said support member comprises a bracket mountable stationarily to support structure of the vehicle.

5. The assembly of claim 4 wherein said torsion spring includes at least a pair of axially spaced coiled body sections encircling said pivot bolt.

6. The assembly of claim 5 wherein said coiled body sections terminate at free ends thereof in end leg portions.

7. The assembly of claim 6 wherein said coiled body section are joined by an intermediate leg portion.

8. The assembly of claim 7 wherein said end leg portions engage one of said steering column and said bracket, and said intermediate leg engages the other of said steering column and said bracket.

9. The assembly of claim 8 wherein said intermediate leg portion is angularly offset form said end leg portions.

10. The assembly of claim 1 wherein said steering column includes a rake adjust released lock mechanism positionable between an unlocked condition for enabling pivotable rake movement of said steering column about said axis and a locked condition for securing said column in a selected position of rake adjustment.

11. The assembly of claim 1 wherein said torsion spring is carried by said lower column jacket in spaced, non-reactive relation to said upper column jacket so as not to impair the telescopic adjustment of said upper and lower column jackets.

12. The assembly of claim 1 wherein said torsion spring exerts substantially uniform counter-active spring force through said adjustment of said rake position along said rake adjust path.

13. The assembly of claim 12 wherein said torsion spring supports said steering column unassisted in any position of rake adjustment along said rake adjustment path.

14. The assembly of claim 1 wherein said steering column includes an upper column jacket, a lower column jacket, and an upper steering shaft extending through said upper and lower column jackets.

15. The assembly of claim 14 wherein said upper steering shaft includes a lower joint end that angulates with said pivotal rake movement of said steering column.

* * * * *